UNITED STATES PATENT OFFICE.

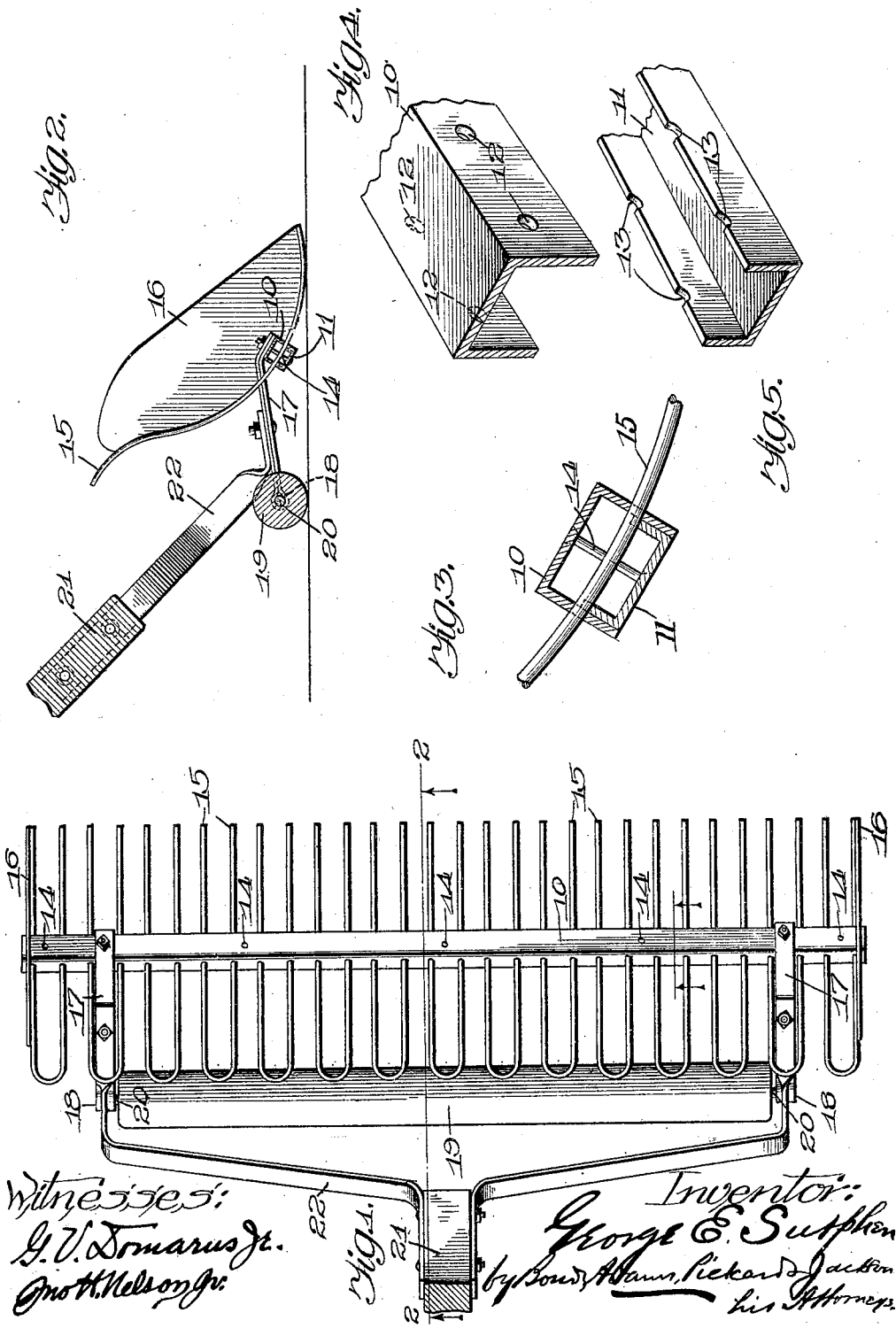

GEORGE E. SUTPHEN, OF AURORA, ILLINOIS.

RAKE.

No. 914,087.   Specification of Letters Patent.   Patented March 2, 1909.

Application filed April 10, 1908. Serial No. 426,276.

*To all whom it may concern:*

Be it known that I, GEORGE E. SUTPHEN, a citizen of the United States, residing at Aurora, county of Kane, State of Illinois, have invented certain new and useful Improvements in Rakes, of which the following is a specification, reference being had to the accompanying drawings.

This invention relates to improvements in rakes adapted to be operated by hand and designed particularly for use in removing cut grass, leaves, etc., from lawns.

It has for its objects to provide a rake for this purpose to which the moving power shall be applied from behind whereby the operator will at all times have a clear view of the ground over which the rake is to be moved; to provide an improved rolling support connected with the rake in the rear thereof; to so connect the handle with the rake that a slight bearing down thereon will raise the forward ends of the rake-teeth from the ground; to provide an improved form of rake-teeth so that such rake-teeth as a whole will provide a curved receptacle adapted to receive a quantity of grass or other matter raked from the ground and hold the same until the operator desires to dump it; to provide an improved head to which the rake-teeth are secured, and to improve generally the construction of rakes that are particularly designed for lawn use.

What I claim as new is set forth in the claims.

In the accompanying drawings:—Figure 1 is a top or plan view of my improved rake, the handle thereof being partly broken away. Fig. 2 is a vertical section at line 2—2 of Fig. 1. Fig. 3 is an enlarged detail, being a section taken at line 3—3 of Fig. 1, through the rake-head. Figs. 4 and 5 are perspective views of the two parts respectively of the rake-head.

In the several figures of the drawings, in which corresponding parts are indicated by like reference numerals:—10—11 indicate a rake-head formed of two pieces of channel iron one piece fitting within the other,—the outer piece being marked 10 and the inner one 11. The portion 10 is provided at regular intervals with holes 12 in its two opposite flanges or sides through which the rake-teeth pass, and the inner channel iron piece is provided in the edges of its two opposite flanges or sides with notches 13. The rake-teeth pass through the holes 12 and lie in the notches 13.

14 indicate rivets passing through the two parts 10—11 of the rake-head, binding such parts together and holding, as will be well understood, the rake-teeth firmly in place. Instead of rivets 14, as shown, bolts and nuts may advantageously be employed, so as to more readily permit of the replacement of damaged teeth with new ones.

15 indicates the rake-teeth, two teeth being preferably formed, as shown in Fig. 1, from a single piece of heavy wire. The teeth are all curved alike, and so curved as to form a comparatively large receptacle well adapted to receive and hold the material that is removed by the teeth from the ground. As shown, the teeth extend both in front and in rear of the rake-head, and when in use, after a comparatively small amount of material has lodged on the teeth in front of the rake-head, the material will thereafter be forced over the rake-head and remain on the rear portion of the teeth, the bowed or curved formation of the teeth permitting the holding there of a large amount of material, and the rake-head itself, projecting as it does above the teeth, will also aid in retaining the mass of material so deposited.

16 indicates two guard plates, which are best formed of sheet-metal, one of said plates being at each side of the machine, and each being notched or cut away to fit over the rake-head, as shown in Fig. 2, and secured in any appropriate manner to the rake-head near one end thereof. Each guard-plate is also further secured and braced in the construction shown by being attached along its under edge to one of the end teeth 15. It can be so secured to the tooth by being soldered thereto or by having its edge wrapped around the tooth or in any other suitable manner.

17—17 indicate two arms projecting rearwardly from the rake-head, to which rake-head their forward ends are bolted, as shown, or are otherwise firmly secured. Each arm, as shown, is located a short distance from one end of the rake-head, and, as shown (see Fig. 2) each arm is composed of a bar bent upon itself, and having at its rear end, or in other words at the center of the bar where it is bent upon itself, an eye 18.

19 indicates a rolling support in rear of the rake-head and having trunnions 20 at its ends which fit in the bearings furnished by the eyes 18—18. This rolling support is best made in the form of a roller as shown, as such form is not liable to be affected by small ruts or depressions in the ground, and hence the rake-teeth will be maintained in proper working position with respect to the ground.

21 indicates an ordinary handle such as is commonly employed in connection with lawn-mowers of the ordinary type, such handle being connected to the machine through two metal straps or bars 22—22, bolted to the lower end of the handle and having their forward ends turned to rest upon the bars 17—17, respectively, to which they are bolted, as shown.

By my invention I provide a cheap, simple and effective device for raking purposes, by the use of which a given quantity of material can be raked from a lawn with greater ease and rapidity than with any of the ordinary styles of hand-rakes now employed. In addition to this advantage, a further advantage of my rake over the ordinary forms of hand-rakes is to be found in the fact that with the ordinary hand-rakes the operator has to ordinarily move backward in the path of the material to be raked, while in the use of my improved rake the rake is pushed in front of the operator, as in the use of an ordinary lawn-mower, and hence the operator can at all times see the ground over which the rake is to be moved. Again, owing to the long curved teeth forming as a whole a comparatively large receptacle, the ends of which are closed by the guard-plates 16—16, a very considerable quantity of material can be accumulated on the teeth before it is necessary to dump the same, and hence the raked material can be by the machine deposited in windrows so as to facilitate the gathering up of the same for removal. To remove a load from the rake-teeth, all that is necessary is to give a backward pull on the handle, which will cause the material to slide from the teeth.

What I claim as my invention and desire to secure by Letters Patent is:—

1. In a rake, the combination with a rake-head and teeth carried thereby, said teeth extending in front and rear of said rake-head and being curved in rear of the said head to form a receptacle of a rolling support in the rear of said head, two rearwardly-projecting bars connected at their forward ends to said rake-head, the rolling support in rear of said head connected to the rear ends of said bars, and a rearwardly-projecting handle.

2. In a rake, the combination with a rake-head and teeth carried thereby, said teeth being curved to form a receptacle for material taken from the ground by the teeth, a guard-plate at each side of the receptacle so formed, said guard-plates being notched or cut away on their lower edges to fit over said rake-head, a rolling support in the rear of said head, means for connecting the rake-head with the support, and a rearwardly-projecting handle.

3. In a rake, the combination with a rake-head and teeth carried thereby, said teeth being curved to form a receptacle for material taken from the ground by the teeth, of a guard-plate at each side of the receptacle so formed, said guard-plates being each secured at its lower edge to one of the end teeth, a rolling support in the rear of said head, means for connecting the rake-head with the support, and a rearwardly-projecting handle.

4. In a rake, the combination with a rake-head comprising two pieces of channel iron arranged one within the other, of rake-teeth passing through openings in one of said pieces, means for drawing and holding the other of said pieces firmly against said teeth, a rolling support in the rear of said rake-head, means for connecting said rake-head to said support, and a rearwardly-projecting handle.

5. In a rake, the combination with a rake-head comprising two pieces of channel iron arranged one within the other, of rake-teeth, passing through openings in one of said pieces, means for drawing and holding the other of said pieces firmly against said teeth, said last-named piece of channel iron being notched to receive said teeth, a rolling support in the rear of said rake-head, means for connecting said rake-head to said support, and a rearwardly-projecting handle.

GEORGE E. SUTPHEN.

Witnesses:
CLIFFORD A. CURRY,
J. C. JAMES.